United States Patent [19]

Sieg et al.

[11] 3,904,715

[45] Sept. 9, 1975

[54] METHOD FOR BONDING A ROCKET MOTOR LINER TO A SOLID ROCKET PROPELLANT GRAIN

[75] Inventors: George F. Sieg; Howard W. Gerrish, Jr.; John D. Braun; M. Frank Pickett, all of China Lake, Calif.

[73] Assignee: The United States of America as represented by the Secretary of the Navy, Washington, D.C.

[22] Filed: Oct. 26, 1971

[21] Appl. No.: 190,448

[52] U.S. Cl. .................. 264/3 R; 102/103; 86/1 R; 149/19.9
[51] Int. Cl.² ........................................... A61J 5/04
[58] Field of Search ........ 264/3 R; 102/103; 86/1 R; 149/19

[56] References Cited
UNITED STATES PATENTS

| | | | |
|---|---|---|---|
| 3,032,449 | 5/1962 | Fox et al. | 149/7 |
| 3,563,966 | 2/1971 | Lowrey et al. | 264/3 R X |
| 3,673,287 | 6/1972 | Thies et al. | 264/3 R |

FOREIGN PATENTS OR APPLICATIONS

| | | | |
|---|---|---|---|
| 45-20196 | 9/1970 | Japan | 264/3 R |

*Primary Examiner*—Samuel Feinberg
*Assistant Examiner*—P. A. Nelson
*Attorney, Agent, or Firm*—R. S. Sciascia; Roy Miller; Lloyd E. K. Pohl

[57] ABSTRACT

A solid rocket propellant grain which contains hydroxy terminated polybutadiene is bonded to a rocket motor liner which contains carboxy terminated polybutadiene by carrying out the following sequence of steps. First, the liner is cast and cured. Then the liner is coated with a solution of a bromine terminated phenol-formaldehyde copolymer which utilizes normal hexane as the solvent. Next, the coat is allowed to dry for from about 15 to about 30 minutes. Finally, the propellant grain is cast and cured.

2 Claims, No Drawings

METHOD FOR BONDING A ROCKET MOTOR LINER TO A SOLID ROCKET PROPELLANT GRAIN

BACKGROUND OF THE INVENTION

1. Field of the Invention

This invention relates to a method for bonding solid rocket propellant grains to rocket motor liners and to the articles obtained. More particularly, this invention relates to a method for bonding solid rocket propellant grains which contain hydroxy terminated polybutadiene to rocket motor liners which contain carboxy terminated polybutadiene and to the articles obtained.

2. Description of the Prior Art.

It is well known that a rocket motor liner should serve three primary purposes. Firstly, it should insulate the motor from the burning propellant. Secondly, it should bond strongly to the propellant grain. Thirdly, it should inhibit the propellant. Formulations which can be cast as rocket motor liners and which will adequately perform all of the above functions have been difficult to achieve. One particular difficulty has been that of bonding the liner to the propellant grain.

The use of polybutadiene in both propellants and liners is also known.

In the past, the primary general method of bonding a polybutadiene containing liner to a polybutadiene containing propellant grain has been that of simply first casting and curing the liner and then casting the propellant. In most cases, the liner has been formulated so as to contain an excess of curing agent which (1) keeps the liner somewhat soft and tacky and (2) helps the liner bond to the propellant by reacting with unused binder terminal groups in the propellant. Since the great majority of the binder terminal groups in the propellant react with the propellants own curing agent and are thus used up, not many of them are available to react with the excess binder curing agent. Thus, the primary mode of bonding between the propellant and the liner is that which occurs due to the tackiness of the liner.

SUMMARY OF THE INVENTION

It has now been found that a cross-linking agent which reacts with double bonds present in polybutadiene molecules is an excellent adhesive material for bonding a polybutadiene-containing propellant to a polybutadiene-containing liner. The cross-linking agent is a bromine terminated phenol-formaldehyde copolymer. It is applied, along with a solvent, in the form of a coat to the cured liner about 15 to 30 minutes prior to casting the propellant grain.

DESCRIPTION OF THE PREFERRED EMBODIMENT

The method according to the present invention essentially comprises three steps. First, a liner containing carboxy terminated polybutadiene is cast into a rocket motor casing and cured. Then a coating of bromine terminated phenol-formaldehyde is applied to the inner surface of the liner and allowed to dry for from about 15 to about 30 minutes at room temperature. Finally, a solid propellant grain which contains hydroxy terminated polybutadiene binder is cast into the motor and cured.

The following are examples of tests used to prove the reliability of the described method.

EXAMPLE I

A plurality of poker chips were coated with a carboxy terminated polybutadiene containing liner mix and placed in an oven overnight at 180° F. to cure. Then the cured liner material on the chips was coated with a mixture containing 10 weight percent bromine terminated phenolformaldehyde copolymer dissolved in 90 weight percent normal hexane and allowed to dry for from 15 to 30 minutes at room temperature. After the bromine terminated phenolformaldehyde coating had dried for 15 to 30 minutes a coating of propellant mix which contained hydroxy terminated polybutadiene as the binder was applied and cured. Then the thus coated chips were compared with other chips, some of which had no coating whatsoever between the liner material and the propellant material and some of which had a fresh coat of the liner mix interposed between the cured liner and the propellant. It was found that the propellant could easily be peeled away from the liner in the case of those which contained no interposed coating or an interposed coating of liner material. On the other hand, those which contained an interposed bromine terminated phenol-formaldehyde copolymer coat between the liner and propellant exhibited excellent bonding.

EXAMPLE II

Poker chips coated in the manner described above were compared after being aged at 135° F. for one through eight weeks. In every case the chips which contained a bromine terminated phenol-formaldehyde copolymer coat between the liner and propellant exhibited better properties than those that did not. That is, after aging at 135° F. for 1, 2, 3, 4, 5, 6, 7, or 8 weeks the samples which contained the bromine terminated phenol-formaldehyde copolymer exhibited bonding superior to that exhibited by those which contained either no interposed coat or an interposed coat of liner material.

The bromine terminated phenol-formaldehyde copolymer utilized in practicing this invention contains from about 28 weight percent to about 32 weight percent bromine. It has a Gardner-Holt viscosity of from about 24 to about 28 at 25° C. and a specific gravity of 1.20 ± 0.03. In addition to terminal bromo groups, it has some terminal methylol groups. It is manufactured by Schenectedy Chemicals, Inc., Schenectedy, New York. A description of how the copolymer may be prepared appears in U.S. Pat. No. 3,752,780 which was filed Apr. 26, 1971 by Kenneth C. Peterson and Charles A. Blowers and which is assigned to Schenectady Chemicals, Inc.

Liner mixes utilized in carrying out the tests described in Examples I and II contained 73 weight percent carboxy terminated polybutadiene having an average molecular weight of from about 4000 to about 5000, 2 weight percent MAPO, 2 weight percent cellulose acetate plastic, 15 weight percent carbon black and 8 weight percent ERLA 0510. ERLA 0510 is a compound having the formula:

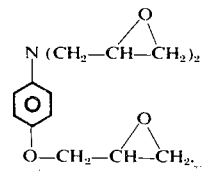

Propellant mixes utilized contained 14 weight percent binder consisting of hydroxy terminated polybutadiene having an average molecular weight of from about 2500 to about 3500 and a diisocyanate curing agent, 1 weight percent transparent $Fe_2O_3$, 15.5 weight percent Al, 40 weight percent ultra fine ammonium perchlorate and 29.5 weight percent 5 micron ammonium perchlorate. Ultra fine ammonium perchlorate was defined as that having particle diameters of less than 1.0 microns with the most predominant size being approximately 0.5 microns.

In tests not described in Examples I and II above, the polybutadiene content of the liner mix was varied from 73 weight percent to 85.9 weight percent, the MAPO content was varied from 1.6 weight percent to 2.4 weight percent, the cellulose acetate percent was varied from 0 weight percent to 2.4 weight percent, the carbon black content was varied from 5 weight percent to 15 weight percent, and the ERLA 0510 content was varied in the range of from 0 to 9.4 weight percent. Also, in some tests other materials such as $TiO_2$ and asbestos were added. In these tests, excellent bonding between the liner and propellant was also obtained.

In a like manner, the composition of the propellant mix may be varied somewhat.

The tests showed that the amount of time that a coat of the copolymer is allowed to dry prior to casting the propellant is critical. If the coat is allowed to dry for more than about 30 minutes a poor bond will be obtained. On the other hand, if the coat is not allowed to dry for at least 15 minutes a portion of the solvent will still be present, having an adverse effect on the propellant.

Since the bromine terminated phenol-formaldehyde resin used to bond the liner to the propellant grain reacts with double bonds and not with terminal groups, it will be apparent that the terminal groups on the binder material in the liner and propellant are important only insofar as they react with their own cross-linking agent, i.e., MAPO or diisocyanate. Thus, if it were desired to do so the liner could contain hydroxy terminated polybutadiene and the propellant could contain carboxy terminated polybutadiene - a direct reversal of the foregoing examples. Or, both the liner and the propellant could contain either hydroxy terminated polybutadiene or carboxy terminated polybutadiene. Further, other double bond containing binders could be used in lieu of polybutadienes.

What is claimed is:

1. A method for chemically attaching a solid rocket propellant grain which contains polybutadiene as the binder to a rocket motor liner which contains polybutadiene, said method comprising the steps of
    a. casting said liner into a rocket motor case and curing it;
    b. painting the cured liner with a coat of a bromine terminated phenol-formaldehyde copolymer dissolved in normal hexane, said copolymer having a bromine content of from 28 to 32 weight percent, a Gardner-Holt viscosity in the range of from 24 to 28 at 25° C., and a specific gravity of $1.20 \pm .03$;
    c. allowing said coat to dry for from about 15 to about 30 minutes at room temperature; and
    d. casting said solid rocket propellant grain into said rocket motor case and curing it.

2. A method according to claim 1 wherein the coat applied in step (b) consists essentially of about 10 weight percent of said copolymer and about 90 weight percent normal hexane.

* * * * *